United States Patent [19]

Kunimi et al.

[11] Patent Number: 5,680,330
[45] Date of Patent: Oct. 21, 1997

[54] METHOD OF AND APPARATUS FOR CALCULATING DIAMETER OF BUNDLE OF ELECTRIC LEADS

[75] Inventors: Takeshi Kunimi; Shinji Okazaki, both of Mie, Japan

[73] Assignee: Sumitomo Wiring Systems, Ltd., Mie, Japan

[21] Appl. No.: 575,146

[22] Filed: Dec. 19, 1995

[30] Foreign Application Priority Data

Dec. 21, 1994 [JP] Japan .................... 6-318727

[51] Int. Cl.⁶ ........................................ H01B 5/08
[52] U.S. Cl. .................. 364/563; 364/564; 364/578; 174/72 A
[58] Field of Search ............... 174/24, 27, 68.1, 174/71 R, 72 A, 72 C, 102 R; 364/563, 564, 578

[56] References Cited

U.S. PATENT DOCUMENTS 5,398,561  3/1995  Tamura .................... 73/865.9
5,418,333  5/1995  Sanders .................... 174/129 R

*Primary Examiner*—Emanuel T. Voeltz
*Assistant Examiner*—Craig Steven Miller
*Attorney, Agent, or Firm*—Beveridge, DeGrandi, Weilacher & Young, L.L.P.

[57] ABSTRACT

An object of this invention is to provide a method of previously calculating the thickness of each of portions of a wiring harness to be produced prior to actually producing the wiring harness. A wiring harness constructed by bundling electric wires of a plurality of types which differ in diameter is assumed as having been converted to a bundle of electric wires of a single type with respect to the electric wires of each type, to find the number of electric wires. The perimeters and the diameters of the bundles of electric wires whose number is found are calculated for electric wires of each type, and the respective average values are respectively regarded as the perimeter and the diameter of the wiring harness. Thus, the thickness of a wiring harness can be approximately calculated in accordance with electric wires constituting the wiring harness.

13 Claims, 8 Drawing Sheets

A : 2.2mm — 12

B : 3.5mm — 4

C : 5.5mm — 2

TOTAL 1 8

$n_1 = 39.375$     $n_2 = 12.857$     $n_3 = 5.207$

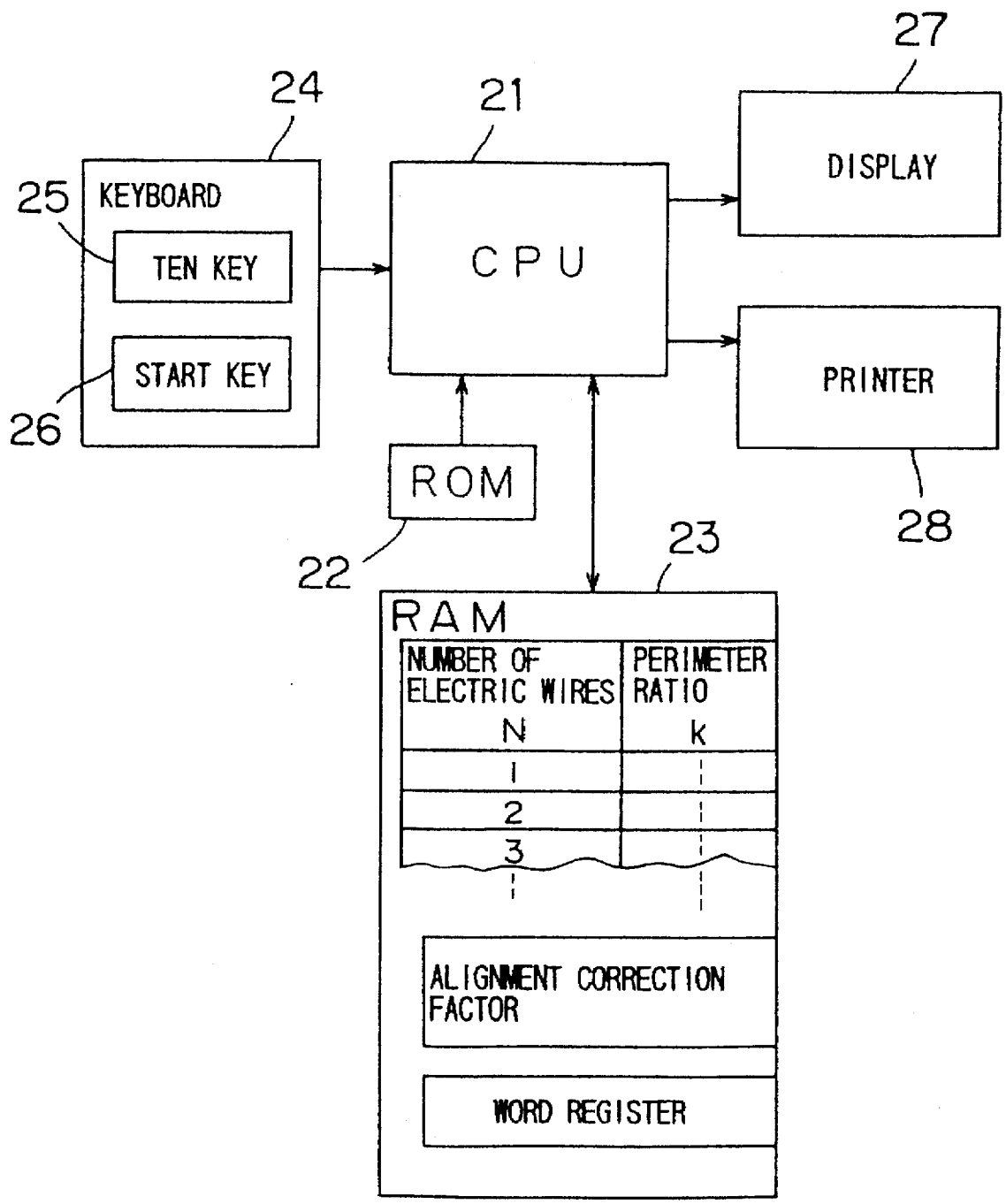
F I G. 8

METHOD OF AND APPARATUS FOR CALCULATING DIAMETER OF BUNDLE OF ELECTRIC LEADS

[DETAILED DESCRIPTION OF THE INVENTION]

[APPLICABLE INDUSTRIAL FIELD]

The present invention relates to a method of and an apparatus for calculating the thickness of a bundle of electric wires (leads). More specifically, the present invention relates to a method of and an apparatus for calculating the thickness of a bundle of electric wires to be produced prior to bundling a plurality of types of electric wires to actually produce such a bundle.

[BACKGROUND OF THE INVENTION]

One example of industrial products manufactured as a bundle of electric wires obtained by bundling a plurality of types of electric wires is a wiring harness. The wiring harness is an electric wiring system comprising a lot of electric wires, terminals, connectors and the like which are incorporated into an automobile, a copying machine or the like, to form a conduction path for supplying power and signals to electrical equipments.

A main body portion of the wiring harness is constructed by bundling a lot of electric wires as described above, and the thickness thereof differs depending on the type and differs for each portion. For example, a trunk portion obtained by bundling the most electric wires and a branch portion constructed by predetermined electric wires branching from the trunk portion respectively differ in the number of electric wires and the type of electric wires included therein, whereby they differ in thickness.

Description is made of a wiring harness for an automobile by way of example. In designing the automobile, the thickness of each of portions of the wiring harness, the diameter occupied by the wiring harness, and the like must be considered. Particularly, the increase in the number of electrical equipments of the automobile with the development of electronics technology significantly increases the number of electric wires constituting the wiring harness. Therefore, the place where the wiring harness is to be contained must be ensured from the design step and represented on a design drawing in manufacturing the automobile.

Furthermore, the wiring harness extending from an engine room to a cabin and further to a luggage room passes through a frame and an iron plate which constitute the body of the automobile. Therefore, the frame and the iron plate must be provided with holes through which the wiring harness is to be passed. The hole must be a hole conforming to the thickness of the wiring harness. Therefore, the thickness of the wiring harness must be specifically written at the time of the design.

However, the wiring harness is a flexible device constructed by bundling a lot of electric wires as described above. The shape and particularly, the thickness of the wiring harness is not easily specified, unlike those of the other components of the automobile.

The thickness of the wiring harness has not been conventionally grasped until the time when a prototype model of a wiring harness is made in the step of producing a prototype model of an automobile.

In other words, the accurate thickness of the wiring harness has not been grasped until the prototype model is made.

On the other hand, not only the length of the wiring harness (the length of electric wires constituting the wiring harness) and the shape thereof but also the thickness of each of the portions of the wiring harness is important information in the design for manufacturing wiring harnesses. The dimensions of an electric wire holding member for assembling the wiring harness, for example, can be determined by accurately grasping the thickness of the wiring harness.

In designing a protector and a corrugated tube which are mounted on a bundle of electric wires assembled and bundled, the accuracy in the thickness of the wiring harness is essential.

Furthermore, it must be confirmed whether or not the thickness of the wiring harness is adapted to the thickness required from an automobile manufacturer.

Additionally, in the manufacturing of wiring harnesses, the thickness of the wiring harness (the perimeter) must be grasped in estimating the amount of vinyl tape to be wound around the wiring harness at the time of assembling.

As described in the foregoing, the thickness of the wiring harness is a value which must be accurately grasped before the wiring harness is actually produced.

[PRIOR ART]

However, the wiring harness is actually constructed by bundling electric wires having various thicknesses, whose shape is not uniformly determined. Therefore, the thickness of the wiring harness is difficult to theoretically calculate and grasp.

Therefore, the thickness of the wiring harness has been conventionally estimated mainly on the basis of experience and experiments. For example, a method of taking particular electric wires of a plurality of types as samples, bundling 10 to 20 sample electric wires to measure the thickness thereof, and previously estimating the thickness of each of portions of the wiring harness on the basis of its measured value has been carried out.

In such a method, however, it is difficult to previously correctly find for each wiring harness to be produced the thickness of each of portions of the wiring harness.

The present invention has been made with such circumstances for a background and has for its one object to provide a method of calculating the diameter of a wiring harness, in which when the type and the number of electric wires constituting a wiring harness to be produced are determined, the thickness of each of portions of the wiring harness can be correctly calculated on the basis of the type and the number, as well as to provide an apparatus for carrying out the calculating method.

Another object of the present invention is to provide a calculating method which is applicable to the general design and fabrication of a bundle of electric wires for estimating the thickness of a bundle of electric wires which is obtained by bundling a plurality of electric wires with higher precision when the bundle of electric wires is designed, as well as to provide an apparatus for carrying out the calculating method.

[SUMMARY OF THE INVENTION]

In accordance with a certain aspect, the present invention is directed to a method of approximately calculating the thickness of a bundle of electric wires which is constructed by bundling electric wires of a plurality of types which differ in diameter, which is characterized by finding the sum of the cross-sectional areas of electric wires constituting a bundle of electric wires to be calculated, calculating the number of electric wires required to obtain the sum of the cross-sectional areas when the bundle of electric wires to be calculated is assumed to be converted to a bundle of electric wires of a single type which is constituted by only electric wires of a predetermined type out of the electric wires constituting the bundle of electric wires to be calculated, and calculating the perimeter and/or the diameter of the bundle of electric wires which is constituted by the electric wires whose number is calculated.

In accordance with another aspect, the present invention is characterized in that in the method of approximately calculating the thickness of a bundle of electric wires, the conversion to the bundle of electric wires of a single type is made with respect to all types of electric wires constituting the bundle of electric wires to be calculated and the number of electric wires by type is calculated.

In accordance with still another aspect, the present invention is characterized in that in the method of approximately calculating the thickness of a bundle of electric wires, a perimeter ratio k previously calculated is used in calculating the perimeter and the diameter from the bundle of electric wires which is constituted by the electric wires whose number is calculated, where the perimeter ratio k is the ratio of the diameter D of the bundle of electric wires of a single type to the diameter d of one of the electric wires constituting the bundle of electric wires, which is defined as K=D/d.

In accordance with still another aspect, the present invention is characterized in that in the method of approximately calculating the thickness of a bundle of electric wires, the perimeter ratio k is approximately calculated by the following equation when the number of electric wires n is a number in a predetermined relatively small number range:

$$k = D/d = 1 + (\sqrt{12 \times n - 3} - 3)/\pi,$$

and the perimeter ratio k is approximately calculated by the following equation when the number of electric wires n exceeds the number in the range:

$$k = \sqrt{\frac{2\sqrt{3n}}{\pi}}$$

In accordance with still another aspect, the present invention is characterized, in the method of approximately calculating the thickness of a bundle of electric wires, by further finding the average value of the perimeters and/or the diameters of the found electric wires by type.

In accordance with still another aspect, the present invention is characterized in that in the method of approximately calculating the thickness of a bundle of electric wires, the average value of the perimeters and/or the diameters of the electric wires by type is found as an average conforming to the ratio of the cross-sectional area of each of the electric wires by type to the sum of the cross-sectional areas of the electric wires constituting the bundle of electric wires to be calculated.

In accordance with still another aspect, the present invention is characterized in that in the method of approximately calculating the thickness of a bundle of electric wires, the perimeter and/or the diameter of the found bundle of electric wires is multiplied by a predetermined alignment correction factor.

In accordance with a further aspect, the present invention is directed to an apparatus for approximately calculating the thickness of a bundle of electric wires which is constructed by bundling electric wires of a plurality of types which differ in diameter, which is characterized by comprising means for inputting data relating to electric wires constituting a bundle of electric wires to be calculated, electric wire number calculating means for finding the sum of the cross-sectional areas of the electric wires constituting the bundle of electric wires to be calculated in response to the termination of input of the diameter of each of the electric wires constituting the bundle of electric wires to be calculated and the number of electric wires from the inputting means and calculating the number of electric wires required to obtain the sum of the cross sectional areas when the bundle of electric wires to be calculated is converted to a bundle of electric wires of a single type which is constituted by only electric wires of a predetermined type out of the electric wires constituting the bundle of electric wires to be calculated, and thickness calculating means for calculating the perimeter and/or the diameter of the bundle of electric wires which is constituted by the electric wires whose number is calculated.

In accordance with a still further aspect, the present invention is characterized in that in the above-mentioned calculating apparatus, the electric wire number calculating means comprises means for converting the bundle of electric wires to be calculated to the bundle of electric wires of a single type with respect to all types of electric wires constituting the bundle of electric wires to be calculated and calculating the number of electric wires by type.

In accordance with a still further aspect, the present invention is characterized in that in the above-mentioned calculating apparatus, the means for calculating the perimeter and/or the diameter comprises means for calculating the perimeter ratio k=D/d when D is taken as the diameter of the bundle of electric wires of a single type and d is taken as the diameter of one of the electric wires constituting the bundle of electric wires, and means for calculating the perimeter and/or the diameter using the calculated perimeter ratio k.

In accordance with a still further aspect, the present invention is characterized, in the above-mentioned calculating apparatus, by further comprising means for multiplying the perimeter and/or the diameter of the found bundle of electric wires by a predetermined alignment correction factor.

According to the present invention, a bundle of electric wires which is constructed by bundling electric wires of a plurality of types which differ in diameter is converted to a bundle of electric wires of a single type which is constituted by only electric wires of a predetermined type out of the electric wires constituting the bundle of electric wires to be calculated, and the perimeter and the diameter of the bundle of electric wires are calculated, whereby the thickness of the bundle of electric wires which is not easily calculated can be found approximately but almost correctly. When the bundle of electric wires to be calculated is converted to a bundle of electric wires of a single type with respect to all the electric wires constituting the bundle of electric wires to be calculated, and the perimeters of bundles of electric wires of a single type are calculated to find the average thereof, the perimeter of the bundle of electric wires can be approximated more accurately.

Furthermore, a calculation using the perimeter ratio k is performed, whereby the calculation can be performed in a short time. Since the perimeter ratio k can be previously calculated and stored, the use of the perimeter ratio k is convenient for calculating the perimeter ratio k.

Additionally, it is also possible to multiply the found result of the calculation by an alignment correction factor in order to more correctly adapt the result of the calculation to the size of the bundle of electric wires.

According to the present invention, the thickness of a bundle of electric wires represented by a wiring harness, for example, which is not easily grasped is uniformly approximated on the basis of the type of electric wires constituting the bundle of electric wires. Particularly when an extremely thick electric wire or thin electric wire exists in the bundle of electric wires, the perimeter of the bundle of electric wires can be found more accurately than that in the conventional calculating method.

In producing a wiring harness as a bundle of electric wires, for example, therefore, the thickness of each of portions of the wiring harness can be almost accurately found in the design step of the wiring harness. As a result, the design of the apparatus in a manufacturing company of wiring harnesses or a company utilizing wiring harnesses, for example, an automobile manufacturer or a copying machine manufacturer is easily performed.

Furthermore, the design of a member required for the construction, the estimate of a required vinyl tape, for example, can be accurately made for the manufacturing company of wiring harnesses.

[BRIEF DESCRIPTION OF THE DRAWINGS]

FIG. 8 is a block diagram showing the construction of a calculating apparatus according to one embodiment of the present invention.

[EMBODIMENTS]

Figure 1:
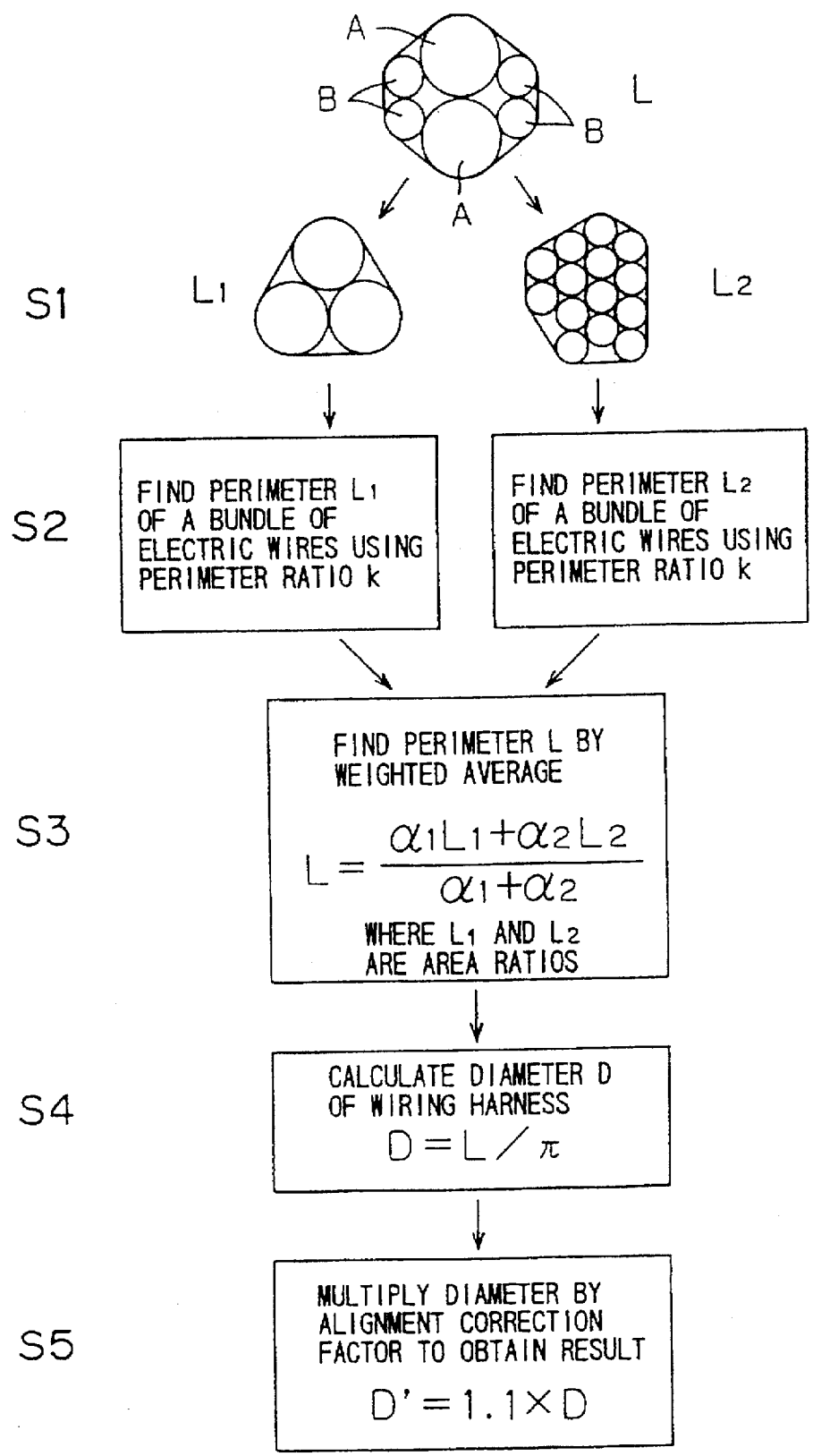
FIG. 1 is a flow chart showing the basic idea of a method of calculating the thickness of a wiring harness according to one embodiment of the present invention.

I. FIG. 1 is a flow chart showing the basic idea of a method of calculating the thickness of a bundle of electric wires according to one embodiment of the present invention.

Referring to FIG. 1, description is made of the procedure for the method of calculating the thickness according to the present embodiment.

(1) A bundle of electric wires is constituted by electric wires of a plurality of types in the present embodiment. The bundle of electric wires first is assumed as having been converted to a bundle of electric wires of a single type (step S1).

The conversion is made assuming that the cross-sectional areas of the electric wires of a single type are the same as the converting conditions.

The conversion to the bundle of electric wires of a single type is made with respect to electric wires of all types included in the bundle of electric wires whose thickness is to be found.

In an example shown in FIG. 1, a simple example in which a bundle of electric wires comprises a relatively thick electric wires A and a relatively thin electric wires B is illustrated. When electric wires of many types, for example, electric wires A, B, C, D, . . . are included in the bundle of electric wires, however, the bundle of electric wires is converted to a bundle of electric wires of a single type with respect to each type of the electric wires A, B, C, D, . . .

(2) The perimeter of the bundle of electric wires of a single type obtained by the conversion is then calculated (step S2).

In the example shown in FIG. 1, the perimeter $L_1$ of a bundle of electric wires A and the perimeter $L_2$ of a bundle of electric wires B are respectively calculated.

In the case of the calculation, a perimeter ratio k is used.

The perimeter ratio k is the ratio of the diameter D of the bundle of electric wires of a single type to the diameter d of one of electric wires constituting the bundle of electric wires, which is defined by the following equation:

$$k = D/d$$

The perimeter ratio k is a value determined in conformity to the number of electric wires n constituting a bundle of electric wires. That is, the perimeter ratio k is a value which can be strictly calculated for each number of electric wires n constituting a bundle of electric wires. It is desired for increasing the calculation speed that the perimeter ratio k is previously calculated in accordance with a method of calculation as described later and is stored in a memory or the like.

The calculation of the perimeter of the bundle of electric wires in the step S2 is performed using the perimeter ratio k previously calculated, as described above. In the example shown in FIG. 1, when the diameter d of the electric wire A is taken as 5 mm, for example, the perimeter $L_1$ in a case where three electric wires A (n=3) are bundled is as follows because k=1.9549 is previously found when n=3:

$$L_1 = \pi \times k \times d = 30.7075 \text{ mm}$$

(3) After the perimeters $L_1$ and $L_2$ of the respective bundles of electric wires obtained by the conversion in the step S2, the weighted average, for example, of the found perimeters $L_1$ and $L_2$ of the respective bundles of electric wires is found, to obtain the perimeter L of a bundle of electric wire to be found (step S3).

The weighted average is calculated using area ratios $\alpha_1$ and $\alpha_2$ occupied by the electric wires of the respective types constituting the bundles of electric wires as weighted factors.

The simple average of not the area ratios but the perimeters $L_1$ and $L_2$ of the respective bundles of electric wires may be found and taken as the perimeter L of the bundle of electric wires.

(4) If the found perimeter L of the bundle of electric wires is divided by the ratio of circumference of a circle to its diameter π, the diameter D of the bundle of electric wires is obtained (step S4).

Furthermore, the obtained diameter D is multiplied by an alignment correction factor, to obtain the diameter D' of the bundle of electric wires actually required (step S5).

The alignment correction factor is a value found by experiments.

In a theoretical formula for calculating the diameter D of the bundle of electric wires in the step 4 and the preceding steps, the electric wires constituting the bundle of electric wires are tangent to each other, and are forced to be handled as electric wires with no clearance therebetween. On the other hand, when the cross section of the actual bundle of electric wires is seen, the electric wires are loosened, whereby there occurs a clearance therebetween. Particularly when the bundle of electric wires is, for example, a wiring harness, there always occurs a clearance therebetween. The reason for this is that the electric wires may not, in some cases, be linearly aligned in the direction of the length to be bundled in the actual bundle of electric wires.

In order to make up the difference between the theory and the practice, the diameter D is multiplied by an alignment correction factor. As a result of multiplying the diameter D by the alignment correction factor, the final diameter D' of the bundle of electric wires is obtained.

The perimeter L of the bundle of electric wires found in the step S3 may be multiplied by the alignment correction factor. That is, (alignment correction factor)×L=L' is found, after which L' is divided by the ratio of circumference of circle to its diameter π to obtain the diameter D' of the bundle of electric wires.

II. Method of finding the perimeter ratio k

Figure 2:
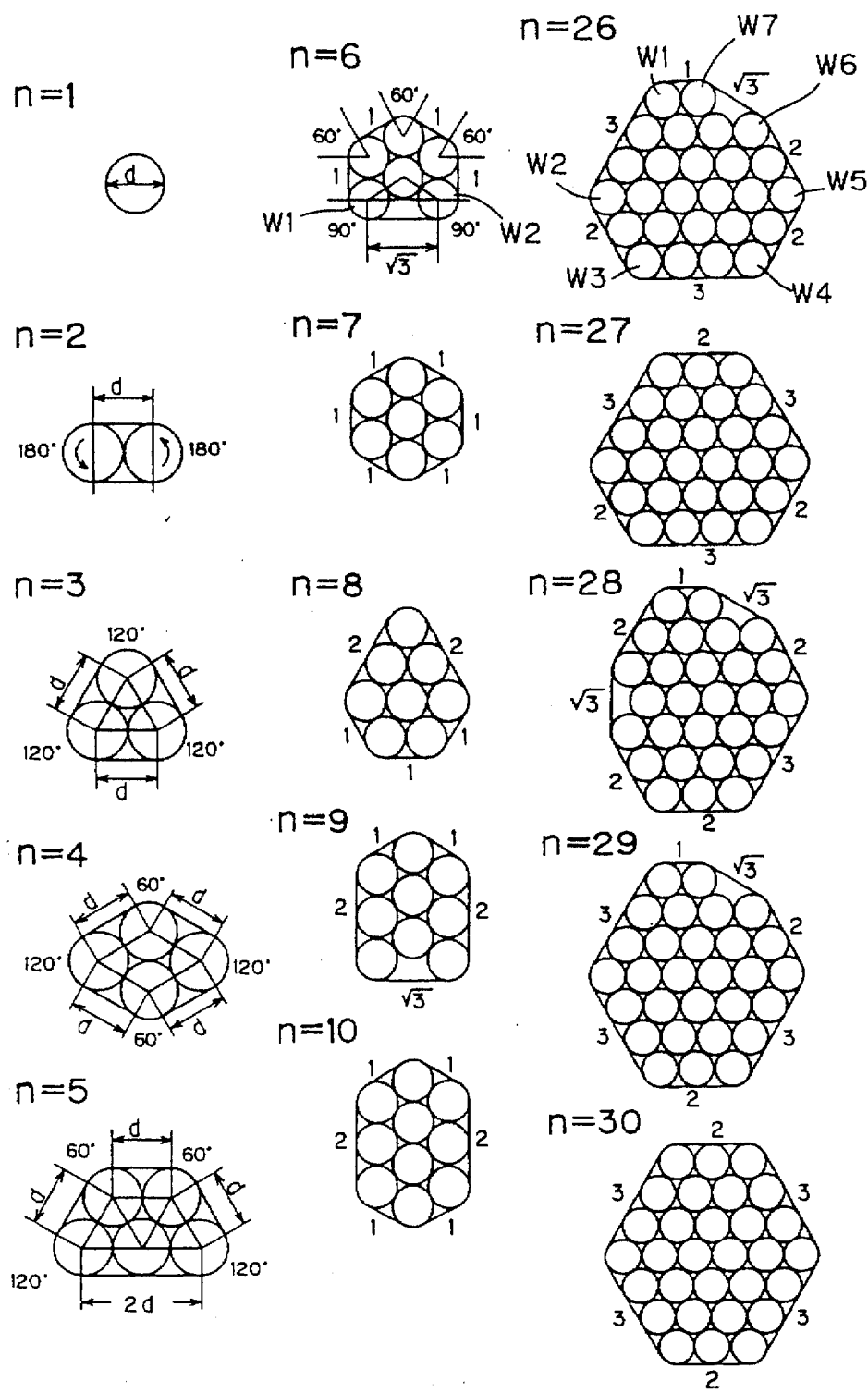
FIG. 2 is an illustration showing a case where the state of the cross section in a case where electric wires having a diameter d are bundled when the number of electric wires n is 1 to 10 and 26 to 30.

FIG. 2 shows the state of the cross section in a case where electric wires having a diameter d are bundled when the number of electric wires n is 1 to 10 and 26 to 30.

Furthermore, the following Table 1 is a list showing the values of the perimeter L in a case where electric wires having a diameter d are bundled, the diameter of the bundle of electric wires D=L/π, and the perimeter ratio k=D/d when the number of electric wires n is 1 to 30.

TABLE 1

L (the perimeter of a bundle of electric wires) = π*k*d,
D (the diameter of a bundle of electric wires) = k*d
(d: the diameter of a line constituting a bundle)
n: the number of electric wires

| | n | π*K | k | calculating method of π*k |
|---|---|---|---|---|
| section1 | 1 | π | 1 | strictly calculate L/d using FIG.2, further divide L/d by π, to calculate k (a figure is drawn because the number of electric wires is small, to obtain strict k) (1 <= n <= 30) |
| | 2 | π + 2 | 1.6366 | |
| | 3 | π + 3 | 1.9549 | |
| | 4 | π + 4 | 2.2732 | |
| | 5 | π + 5 | 2.5916 | |
| | 6 | π + 4 + $\sqrt{3}$ | 2.8246 | |
| | 7 | π + 6 | 2.9099 | |
| | 8 | π + 7 | 3.2282 | |
| | 9 | π + 6 + $\sqrt{3}$ | 3.4612 | |
| | 10 | π + 8 | 3.5465 | |
| | 11 | π + 7 + $\sqrt{3}$ | 3.7795 | |
| | 12 | π + 9 | 3.8648 | |
| | 13 | π + 8 + $\sqrt{3}$ | 4.0978 | |
| | 14 | π + 10 | 4.1831 | |
| | 15 | π + 9 + $\sqrt{3}$ | 4.4161 | |
| | 16 | π + 11 | 4.5014 | |

TABLE 1-continued

L (the perimeter of a bundle of electric wires) = π*k*d,
D (the diameter of a bundle of electric wires) = k*d
(d: the diameter of a line constituting a bundle)
n: the number of electric wires

| n | π*K | k | calculating method of π*k |
|---|---|---|---|
| 17 | π + 8 + 2$\sqrt{3}$ | 4.6491 | |
| 18 | π + 10 + $\sqrt{3}$ | 4.7344 | |
| 19 | π + 12 | 4.8197 | |
| 20 | π + 11 + $\sqrt{3}$ | 5.0527 | |
| 21 | π + 13 | 5.1380 | |
| 22 | π + 10 + 2$\sqrt{3}$ | 5.2858 | |
| 23 | π + 12 + $\sqrt{3}$ | 5.3710 | |
| 24 | π + 14 | 5.4563 | |
| 25 | π + 11 + 2$\sqrt{3}$ | 5.6041 | |
| 26 | π + 13 + $\sqrt{3}$ | 5.6894 | |
| 27 | π + 15 | 5.7746 | |
| 28 | π + 12 + 2$\sqrt{3}$ | 5.9224 | |
| 29 | π + 14 + $\sqrt{3}$ | 6.0077 | |
| 30 | π + 16 | 6.0930 | |

Referring to FIG. 2 and Table 1, description is made of a method of calculating the perimeter ratio k.

Further, when the number of electric wires n is 1, the calculation can be simply performed, whereby the perimeter L=πd, the diameter D=L/π=d, and the perimeter ratio k=D/d=1.

When the number of electric wires is 2, the distance between the centers of the adjacent two electric wires is d, whereby the perimeter L is L=πd+2d, as indicated by n=2 in FIG. 2. Accordingly, the diameter D is D=L/π=(1+2/π)d=1.6366d.

Consequently, "the perimeter ratio k=1.6366".

Furthermore, when the number of electric wires n is 3, the perimeter L is determined by a contour formed by a peripheral surface at an angle of 120° of each of the three electric wires and the distance d among the three electric wires, as indicated by n=3 in FIG. 2, whereby L=πd+3d.

Consequently, the diameter D of the bundle of electric wires becomes D=L/π=(1+3/π) d=1.9549d.

Accordingly, "the perimeter ratio k=1.9549".

Furthermore, when the number of electric wires n is 6, the distance between an electric wire w1 and an electric wire w2 is $\sqrt{3}$d. When the number of electric wires n is 6, therefore, the perimeter L is L=πd+(4+$\sqrt{3}$) d. Consequently, the diameter D of the bundle of electric wires becomes D=L/π=(1+(4+$\sqrt{3}$)/π) d=2.8246d.

Consequently, "the perimeter ratio k=2.8246".

The perimeter L in a case where electric wires of the same type having a diameter of d and having the same thickness are bundled can be represented by the sum of a curved line portion formed by the peripheral surfaces of the electric wires and the distance between the electric wires. The sum of the lengths of the curved line portions formed by the peripheral surfaces of the electric wires is always πd.

In the foregoing Table 1, π×k and the perimeter ratio k are represented as a section 1 with respect to each of the number of electric wires n is 1 to 30. A calculating method of π×k is also shown. The perimeter L of the bundle of electric wires is L=π×k×d, and the diameter D of the bundle of electric wires is D=k×d.

Referring to the cross section of a bundle of electric wires in a case where n=26 shown in FIG. 2, a calculating method in a case where the number of electric wires n=26 will be described.

The perimeter L of 26 electric wires becomes the sum of a curved line portion πd at a total of 360° comprising the perimeters of portions at an angle of 60° of electric wires w1, w2, w3, w4 and w5 and the perimeters of portions at an angle of 30° of electric wires w6 and w7, and the distance 3d between the electric wires w1 and w2, the distance 2d between the electric wires w2 and w3, and the distance 3d between the electric wires w3 and w4, and the distance 2d between the electric wires w4 and w5, the distance 2d between the electric wires w5 and w6, and the distance √3d between the electric wires w6 and w7, and the distance d between the electric wires w7 and w1.

That is, L=πd+(13+√3) d.

Accordingly, the diameter D of a bundle of 26 electric wires becomes D=L/π=(1+(13+√3)/π) d=5.6894d. Consequently, "the perimeter ratio k=5.6894".

In the present embodiment, when the number of electric wires n is 1 to 30, the perimeter ratio k is previously strictly calculated in accordance with the foregoing calculation.

Furthermore, the calculation can be also similarly performed in a case where the number of electric wires n is not less than 31. In the present embodiment, however, when 31≦n≦127, the perimeter ratio k is found by approximate calculation using the following calculation equation.

When the number of electric wires n is 1, 7, 19, 37, 61, 91 and 127, the cross-sectional shape of the bundle of electric wires becomes a regular hexagon. The regular hexagon is closest to a circle and in a dynamically stable shape, and the perimeter L thereof can be accurately represented by the following equation:

$$L = \pi d + (\sqrt{12 \times n - 3} - 3)d$$

In the present embodiment, therefore, when 31≦n≦127, it is approximately considered that the foregoing equation (1) holds with respect to all values of n even in a case other than cases where n=37, 61, 91 and 127, to calculate the perimeter ratio k. That is, when 31≦n≦127, the perimeter ratio k is found by the following equation (1):

$$k = D/d = L/(\pi \times d) \qquad (1)$$
$$= 1 + (\sqrt{12 \times n - 3} - 3)/\pi$$

where n is the number of electric wires,

31≦n≦127

When the number of electric wire n is 128≦n, the cross-sectional shape of the bundle of electric wires is closer to a circle, whereby the perimeter ratio k is approximately calculated by the following equation (2) approximated in a honeycomb shape.

$$k = \sqrt{\frac{2\sqrt{3n}}{\pi}} \qquad (2)$$

A value of π×k and a perimeter ratio k with respect to the typical number of electric wires n calculated on the basis of the foregoing equations (1) and (2), along with a calculating method of π×k, are represented as a section 2 and a section 3 in Table 2.

TABLE 2

| | n | π*K | k | calculating method of π*k |
|---|---|---|---|---|
| section 2 | 31 | 19.3510 | 6.1596 | calculate the perimeter |
| | 32 | 19.6608 | 6.2582 | calculate the perimeter |
| | 33 | 19.9658 | 6.3553 | ratio k by an |
| | 34 | 20.2662 | 6.4509 | approximate expression |
| | 35 | 20.5622 | 6.5451 | $k = 1 + (\sqrt{12n - 3} - 3)/\pi$ |
| | 36 | 20.8539 | 6.6380 | (31 <= n <= 127) |
| | 37 | 21.1416 | 6.7296 | calculate π*k from k |
| | 38 | 21.4254 | 6.8199 | |
| | 39 | 21.7055 | 6.9091 | |
| | 40 | 21.9819 | 6.9971 | |
| | 50 | 24.5752 | 7.8225 | |
| | 61 | 27.1416 | 8.6394 | |
| | 70 | 29.0725 | 9.2540 | |
| | 91 | 33.1416 | 10.5493 | |
| | 100 | 34.7393 | 11.0578 | |
| | 127 | 37.1768 | 11.8337 | |
| section 3 | 128 | 37.3229 | 11.8802 | calculate the perimeter |
| | 200 | 46.6536 | 14.8503 | ratio k by an |
| | 400 | 65.9782 | 21.0015 | approximate expression |
| | 500 | 73.7658 | 23.4804 | $k = \sqrt{2\sqrt{3} \, n/\pi}$ (128 <= n) |
| | 600 | 80.8064 | 25.7215 | calculate π*k from k |
| | 1000 | 104.3206 | 33.2063 | |

Although description was made of the perimeter ratio k in a case where the number of electric wires n is an integer, the number of electric wires n may, in some cases, be a value between adjacent integers including a decimal unit in a case where the bundle of electric wires n is converted to a bundle of electric wires of a single type.

Figure 3:
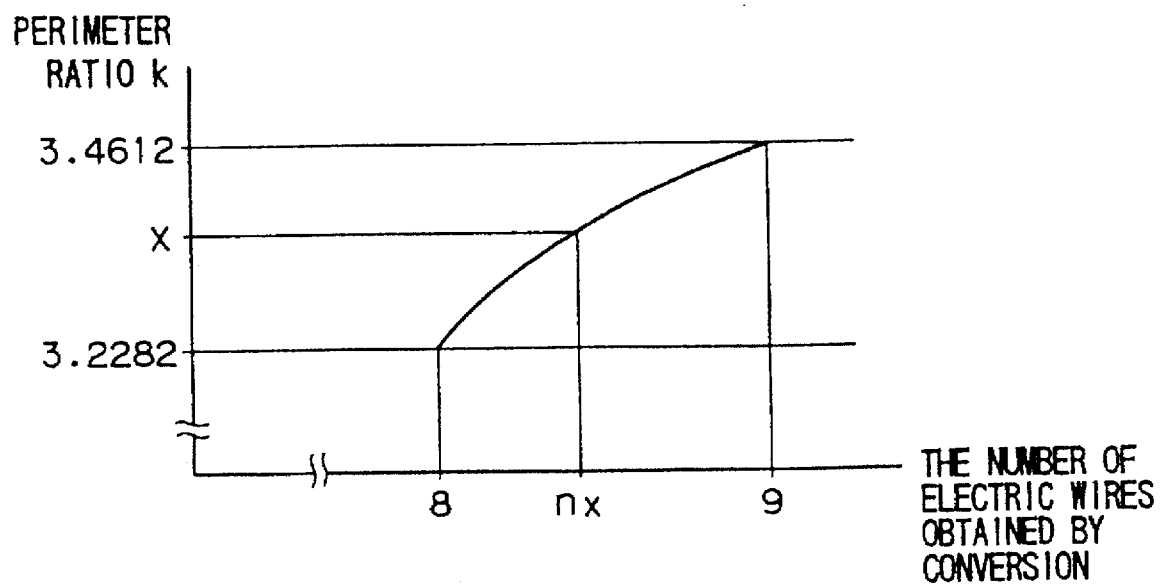
FIG. 3 is a diagram for explaining a method of interpolating the perimeter ratio k in a case where the number of electric wires n is a value between two adjacent integers using values of the number of electric wires corresponding to the two adjacent integers.

When the number of electric wires n obtained by the conversion is a value between adjacent integers, the perimeter ratio k=D/d=L/πd may be interpolated using values of the number of electric wires corresponding to the two adjacent integers. The method will be described with reference to FIG. 3.

When the number of electric wires $n_x$ which is a value between adjacent integers is 8≦$n_x$≦9, for example, the perimeter ratio k is as follows:

$$k = \{(n_x - 8)/(9 - 8)\} \times (3.4612 - 3.2282) + 3.2282$$
$$= (n_x - 8) \times 0.233 + 3.2282$$

Furthermore, in a case where 31≦$n_x$≦127, the calculation may be directly performed by substituting $n_x$ which is a value between adjacent integers in the equation (1).

For example, the perimeter ratio k may be:

$$k = 1 + (\sqrt{12 \times n_x - 3} - 3)/\pi$$

III. Example of calculation

Figure 4:
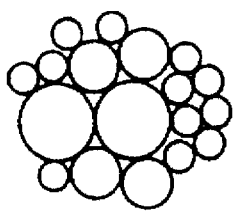
FIG. 4 is a cross-sectional view showing an example of the construction of a wiring harness to be calculated
Figure 5:
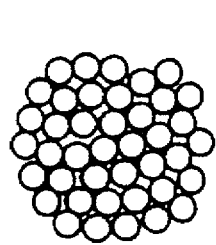
FIG. 5 is a cross-sectional view showing a state where a wiring harness to be calculated is converted to a bundle of electric wires of a single type.
Figure 5:
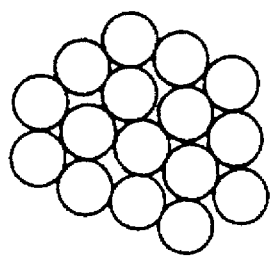
Figure 5:
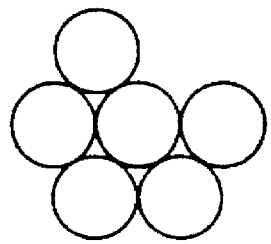

A specific example of calculation using a calculation equation according to one embodiment of the present invention will be described with reference to FIGS. 4 and 5.

A wiring harness is taken as a bundle of electric wires to be calculated by way of example. As shown in FIG. 4, a wiring harness to be calculated shall be constructed by bundling a total of 18 electric wires. That is, 12 electric wires having a diameter $d_1$ of 2.0 mm, four electric wires having a diameter $d_2$ of 3.5 mm, and two electric wires having a diameter $d_3$ of 5.5 mm shall be bundled.

In this case, area weights $\alpha_1$, $\alpha_2$ and $\alpha_3$ of the electric wires A, B and C are respectively found by the following equations:

The cross-sectional area of the electric wire A:

$(\pi d_1^2/4) \times 12 = 12\pi$

The cross-sectional area of the electric wire B:

$(\pi d_2^2/4) \times 4 = 12.25\pi$

The cross-sectional area of the electric wire C:

$(\pi d_3^2/4) \times 2 = 15.125\pi$

Accordingly, the total cross-sectional area $\alpha$ of the bundle of electric wires is as follows:

$\alpha = (12 + 12.25 + 15.125)\pi = 39.375\pi$

Accordingly, the area weights $\alpha_1$, $\alpha_2$ and $\alpha_3$ of the electric wires A, B and C are respectively as follows:

$\alpha_1 = \dfrac{12\pi}{\alpha} = \dfrac{12\pi}{39.375\pi} = 0.3048$ $\alpha_2 = \dfrac{12.25\pi}{\alpha} = \dfrac{12.25\pi}{39.375\pi} = 0.3111$ $\alpha_3 = \dfrac{15.125\pi}{\alpha} = \dfrac{15.125\pi}{39.375\pi} = 0.3841$ A number in a case where the bundle of electric wires to be calculated is converted to a bundle of electric wires of a single type is then found with respect to each of the electric wires A, B and C.

If the bundle of electric wires to be calculated is converted to a bundle of electric wires of a single type assuming that the cross-sectional areas of the electric wires are the same, the following results are respectively obtained:

A number $n_1$ in a case where the bundle of electric wires to be calculated is converted to a bundle of electric wires A:

$n_1 = \dfrac{\alpha}{\pi d_1^2/4} = \dfrac{4 \times 39.375\pi}{\pi d_1^2} = \dfrac{4 \times 39.375\pi}{4\pi}$ $= 39.375$ A number $n_2$ in a case where the bundle of electric wires to be calculated is converted to a bundle of electric wires B:

$n_2 = \dfrac{\alpha}{\pi d_2^2/4} = \dfrac{4 \times 39.375\pi}{\pi d_2^2} = \dfrac{4 \times 39.375\pi}{12.25\pi}$ $\approx 12.857$ A number $n_3$ in a case where the bundle of electric wires to be calculated is converted to a bundle of electric wires C:

$n_3 = \dfrac{\alpha}{\pi d_3^2/4} = \dfrac{4 \times 39.375\pi}{\pi d_3^2} = \dfrac{4 \times 39.375\pi}{30.25\pi}$ $\approx 5.207$ When the perimeter is calculated in accordance with the above-mentioned calculating method on the basis of the results, the following results are obtained:

A perimeter ratio $k_1$ in a case where the number of electric wires $n_1 = 39.375$ is as follows:

$k_1 = \dfrac{n_1 - 39}{40 - 39} \times (6.9971 - 6.9091) + 6.9091$ $= 6.9421$

Accordingly, the perimeter $L_1$ of the bundle of electric wires A is as follows:

$L_1 = k_1 \pi d_1$ $= 6.9421 \times 2\pi$ $= 13.8841\pi$

A perimeter ratio $k_2$ in a case where the number of electric wires $n_2$ is 12.857 is as follows:

$k_2 = \dfrac{n_2 - 12}{13 - 12} \times (4.0978 - 3.8648) + 3.8648$ $\approx 4.0645$ Accordingly, the perimeter $L_2$ of the bundle of electric wires B is as follows:

$L_2 = k_2 \pi d_2$ $= 4.0645 \times \pi \times 3.5$ $\approx 14.2258\pi$

A perimeter ratio $k_3$ in a case where the number of electric wires $n_3$ is $= 5.207$ is as follows:

$k_3 = \dfrac{n_3 - 5}{6 - 5} \times (2.8246 - 2.5916) + 2.5916 \approx 2.6397$

Accordingly, the perimeter $L_3$ of the bundle of electric wires C is as follows:

$L_3 = k_3 \pi d_3$ $= 2.6398 \times \pi \times 5.5$ $= 14.5186\pi$

The perimeter and the diameter of the wiring harness obtained by further finding the weighted average are as follows:

The perimeter L found by finding the weighted average is as follows:

$L = L_1 \times \alpha_1 + L_2 \times \alpha_2 + L_3 \times \alpha_3$ $= (13.8841 \times 0.3048 + 14.2258 \times 0.3111 +$
$\quad 14.5186 \times 0.3841)\pi \approx 14.2341 \times \pi$ $= 44.7178$ Furthermore, the diameter $D = L/\pi$ is as follows:
$D = 14.2341$ IV. Alignment correction factor FIG. 6 shows, with respect to a wiring harness, the contrast between the measured value of the diameter of the wiring harness and the diameter found by the calculation equation according to the present invention.

Figure 6:
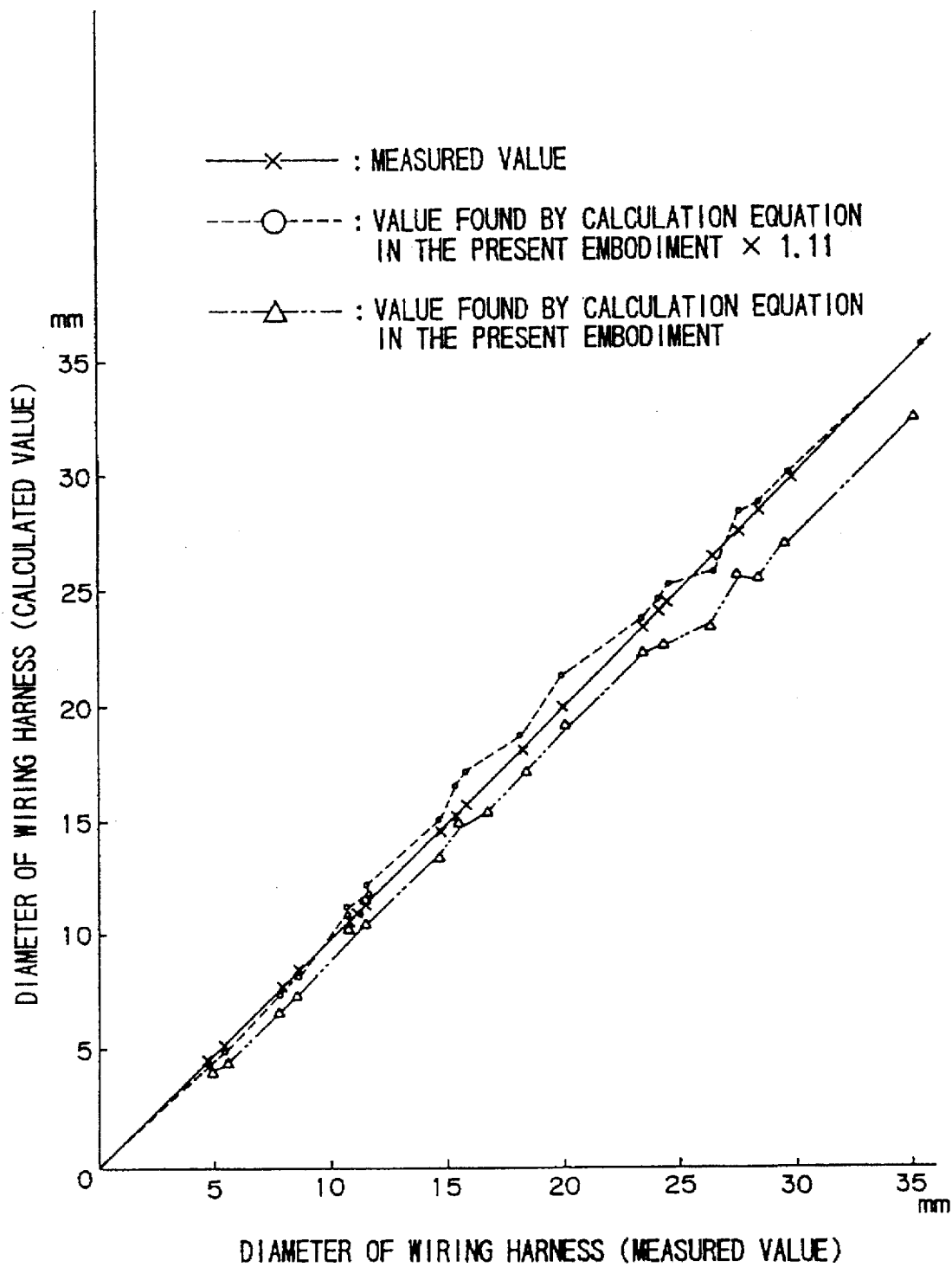
FIG. 6 is a graph showing the contrast between the measured value of the diameter of a wiring harness and the diameter found by a calculation equation according to the present invention.

In FIG. 6, the horizontal axis indicates the diameter of the wiring harness (the measured value), and the vertical axis indicates the diameter of the wiring harness (the calculated value). As apparent from FIG. 6, the diameter of the wiring harness found by the calculation becomes a value smaller by approximately 10% than the measured value when it is not multiplied by an alignment correction factor. The reason for this is conceivably that the calculation is performed assuming that a clearance is formed between electric wires in the actual wiring harness, while there is no such clearance in the calculated value.

When the alignment correction factor is determined as 1.11, for example, to multiply the calculated value by the alignment correction factor on the basis of such a graph, therefore, the diameter of the wiring harness obtained by the calculation becomes approximately equal to the measured value.

Experiments show that the alignment correction factor takes a value in the range of 1 to 1.2 in many cases. The alignment correction factor is not a value theoretically determined but strongly relates to the manufacturing technique in the manufacturing field of wiring harnesses. The reason for this is that there is little clearance formed between the electric wires if the technique for manufacturing wiring harnesses is high, and a clearance formed between the electric wires is reduced by the tension of a tape when the tape is wound around the bundled electric wires. Although it is preferable that the alignment correction factor is theoretically 1.0, it is considered that the alignment correction factor may be set to a suitable value in the abovementioned range in the light of the manufacturing field of wiring harnesses, for example.

V. Design drawing

Figure 7:
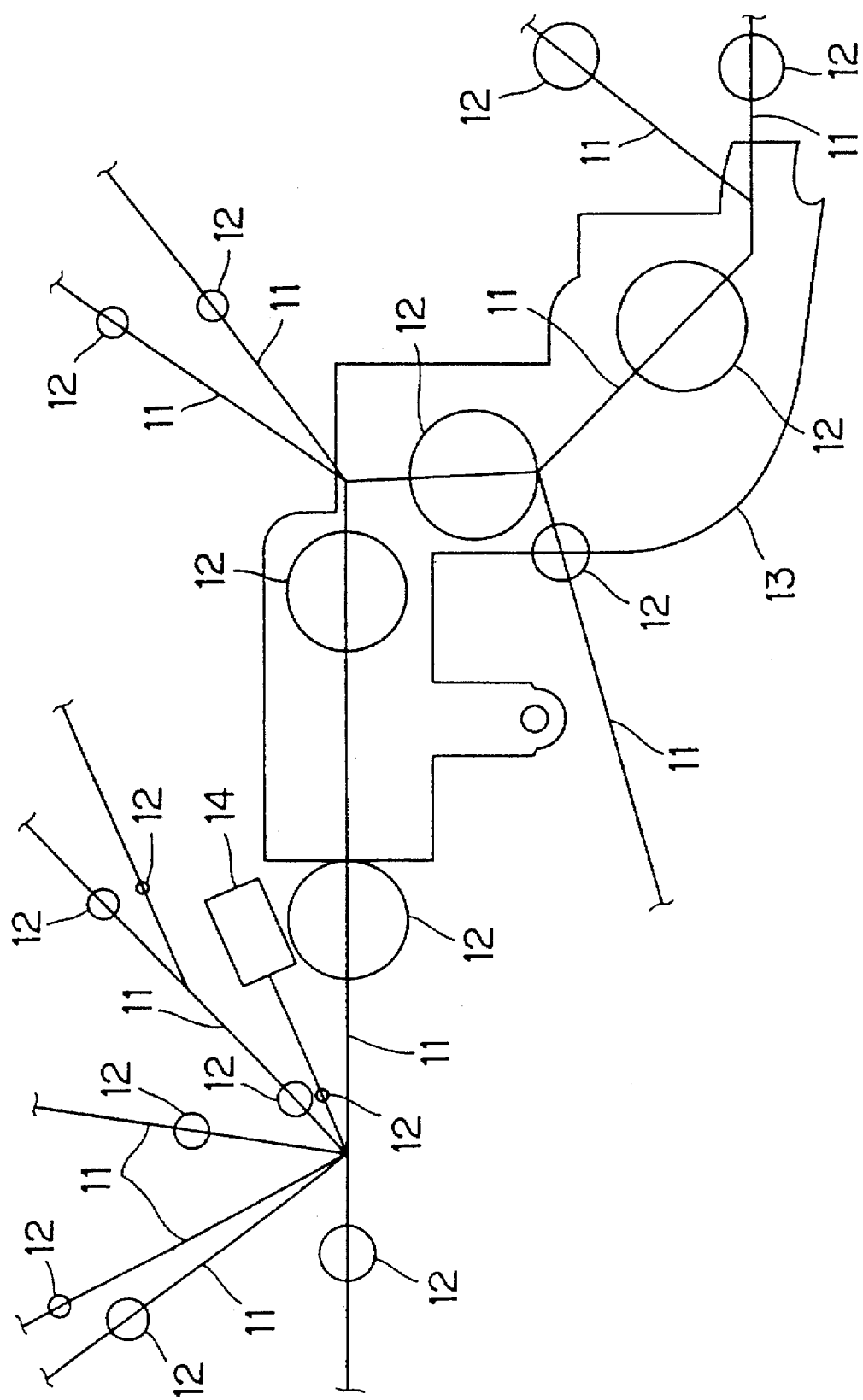
FIG. 7 is a diagram showing one example of a design drawing of a wiring harness in which the thickness of the wiring harness is entered.

FIG. 7 shows one example of a design drawing of a wiring harness in which the thickness of the wiring harness found by the calculation equation according to the present embodiment is entered. A line 11 indicated by a solid line in FIG. 7 represents the form of laying out electric wires. A circle 12 indicated by a solid line represents the thickness of the wiring harness. Reference numeral 13 denotes the position where a protector is mounted, and reference numeral 14 denotes the position where a connector is mounted.

VI. Calculating apparatus

FIG. 8 is a block diagram showing the construction of an apparatus for carrying out a method of calculating the thickness of a bundle of electric wires according to one embodiment of the present invention.

The apparatus comprises a CPU 21 serving as an operation center. A ROM 22 storing an operation program and a RAM 23 to and from which required data is freely written and read out are connected to the CPU 21.

Furthermore, various data can be entered from a keyboard 24 to the CPU 21. For example, data relating to electric wires, for example, can be entered from a ten key 25. In addition, a start key is for feeding a processing start signal as described later.

The keyboard 24 may be provided with various keys, for example, an alphabet key and an operation key in addition to the illustrated keys.

In the present embodiment, the relationship between the number of electric wires N and a perimeter ratio k is previously stored in the RAM 23. The perimeter ratio k is previously calculated with respect to a required range of the number of electric wires n (where $1 \leq n$) in accordance with the above-mentioned procedure for calculation.

The alignment correction factor is further previously set in the RAM 23. The RAM 23 is further provided with a work register for storing electric wire data or the like entered from the keyboard 24.

The CPU 21 executes an operation for calculating the diameter of a wiring harness, for example, serving as a bundle of electric wires as described later in accordance with a predetermined operation program stored in the ROM 22. The result of the operation is displayed on a display device 27, and is printed out from a printer 28.

Figure 9:
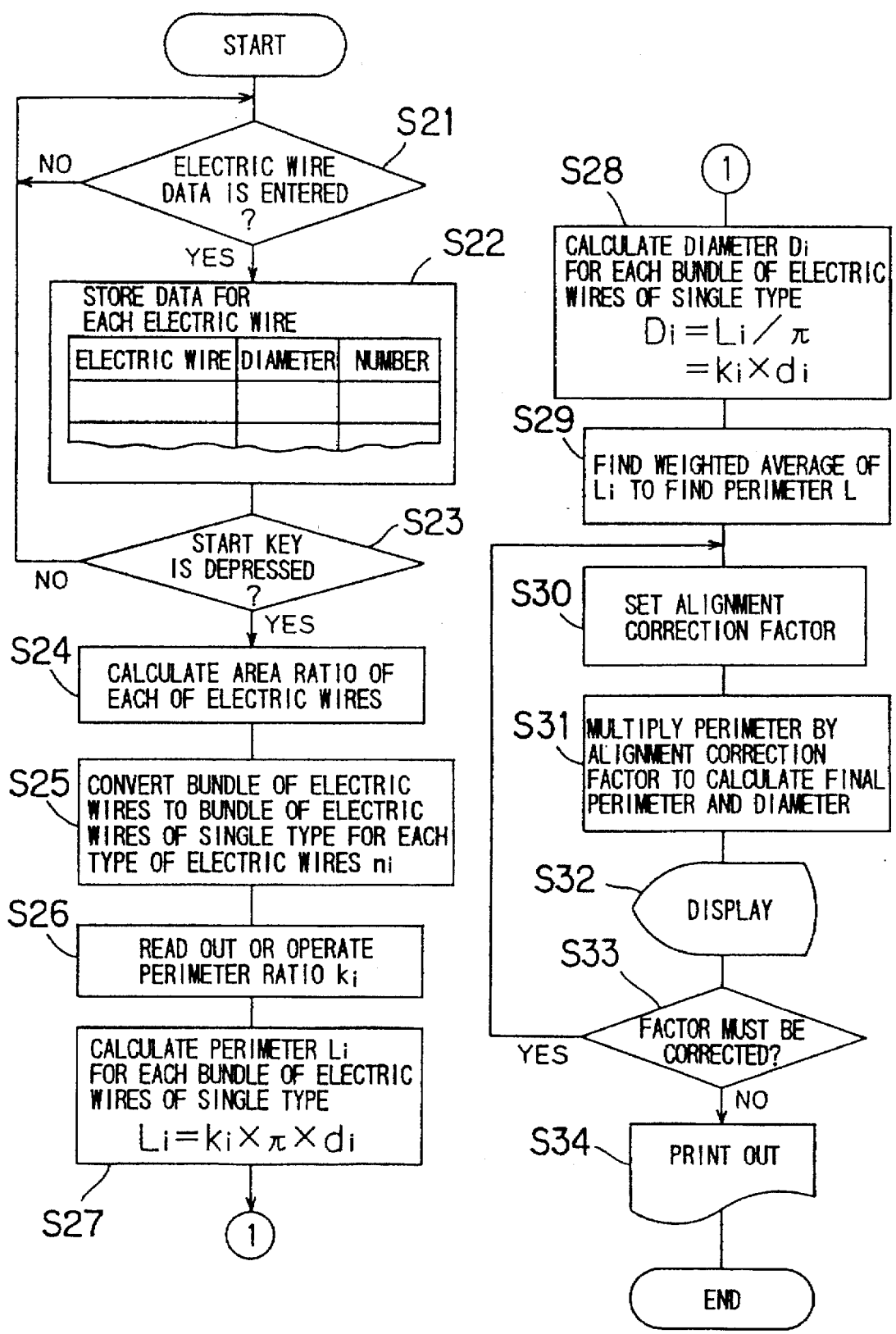
FIG. 9 is a flow chart showing the operation of the calculating apparatus shown in FIG. 8.

FIG. 9 is a flow chart showing the operation of the calculating apparatus shown in FIG. 8.

Description is now made of the operation of the calculating apparatus shown in FIG. 8 in accordance with the flow of FIG. 9.

When the operation of the calculating apparatus is started, the CPU 21 judges whether or not electric wire data is entered from the keyboard 24 (step S21). If the electric wire data is entered, the data is stored for each electric wire (step S22). Consequently, the diameter and the number of electric wires constituting a wiring harness whose thickness must be calculated are given.

The CPU 21 then waits until the start key 26 is depressed (step S23), and first calculates the area ratio of each of the electric wires constituting the wiring harness when the start key is turned on (step S24).

The bundle of electric wires constituting the wiring harness is converted to a bundle of electric wires of a single type for each type of electric wires constituting the wiring harness, to find the number of electric wires (step S25).

The perimeter ratio k is then read out from the RAM 23. If the required perimeter ratio k is not stored in the RAM 23, the perimeter ratio k is operated.

For example, when the number of electric wires obtained by the conversion is a value between adjacent integers, for example, the perimeter ratio k is calculated in accordance with the above-mentioned procedure for calculation.

The perimeter ratio k is then used, to calculate the perimeter for each bundle of electric wires of a single type (step S27).

The diameter for each bundle of electric wires of a single type is calculated (step S28).

Thereafter, the weighted average of the perimeters for the bundles of electric wires of a single type calculated in the step S27 is found, to obtain the required perimeter L of the wiring harness (step S29).

An alignment correction factor is then set (step S30). The alignment correction factor is previously stored in the RAM 23 in the present embodiment. Accordingly, the alignment correction factor is read out from the RAM 23, and is set (step S30).

The perimeter L found in the step S29 is then multiplied by the alignment correction factor, to calculate the final perimeter L' and the final diameter D' of the wiring harness (step S31).

The calculated perimeter L' and the calculated diameter D' are displayed on the display device 27 (step S32).

An operator confirms the display on the display device 27, and enters, if the alignment correction factor must be corrected, the necessary the correction.

For example, when the wiring harness is of special construction so that the alignment correction factor must be made slightly larger than the normal correction factor or conversely, the alignment correction factor is made smaller, for example, the necessity of correcting the alignment correction factor is entered.

Upon judging that the alignment correction factor must be corrected, the CPU 21 newly sets an alignment correction factor to be corrected (step S30). The perimeter L' and the diameter D' are calculated again using the alignment correction factor (step S31), and the result of the calculation is displayed on the display device 27 (step S32).

The content of the display on the display device 27 is confirmed. If the content of the display is acceptable, a signal indicating that the result of the display is to be printed out is fed, whereby the result of the calculation is printed out by the printer 28 (step S34).

What is claimed is:

1. A method of approximately calculating the thickness of a bundle of electric wires to be constructed by bundling plural types of electric wires which differ in diameter, said method comprising the steps of:

storing wire data that is representative of a diameter of each type of wire and the number of each type of wire of the plural types of wires;

based upon the wire data, determining sum data representative of a sum of cross-sectional areas of electric wires constituting the bundle of plural types of electric wires; assuming the bundle to be a bundle of electric wires of a single type which is constituted by only electric wires of a predetermined type out of the plural types of electric wires;

calculating number of wire data representative of the number of predetermined type wires required for the assumed bundle to have a sum of cross sectional areas that is the same as the sum represented by the sum data; and calculating thickness data representative of the thickness of the bundle of electric wires which is constituted by the plural types of electric wires based upon the number of wire data.

2. The method of approximately calculating the thickness of a bundle of electric wires according to claim 1, wherein said step of assuming the bundle to be a bundle of electric wires of a single type is performed for all plural types of electric wires, and said step of calculating number of wire data is performed to calculate the number of electric wires for each type.

3. The method of approximately calculating the thickness of a bundle of electric wires according to claim 2, wherein said step of calculating the thickness data includes the step of obtaining a perimeter ratio k where the perimeter ratio k is the ratio of the diameter D of an assumed bundle of electric wires of a single type to the diameter d of one of the electric wires constituting the bundle of electric wires, which is defined by the following equation:

$k=D/d.$

4. The method of approximately calculating the thickness of a bundle of electric wires according to claim 1, wherein said step of calculating the thickness data includes the step of obtaining a perimeter ratio k where the perimeter ratio k is the ratio of the diameter D of the assumed bundle of electric wires of a single type to the diameter d of one of the electric wires constituting the bundle of electric wires, which is defined by the following equation:

$k=D/d.$

5. The method of approximately calculating the thickness of a bundle of electric wires according to claim 4, wherein said perimeter ratio k is approximately calculated by the following equation when the number of electric wires n is a number in a predetermined relatively small number range:

$$k = D/d = 1 + (\sqrt{12 \times n - 3} - 3)/\pi,$$

and the perimeter ratio k is approximately calculated by the following equation when the number of electric wires n exceeds the number in said range:

$$k = \sqrt{\frac{2\sqrt{3n}}{\pi}}.$$

6. The method of approximately calculating the thickness of a bundle of electric wires according to claim 5, wherein the average value data representative of the average value of the thickness of the electric wires by type is found as an average corresponding to the ratio of the cross-sectional area of each of the electric wires by type to the sum of the cross-sectional areas of the electric wires constituting the bundle of plural types of electric wires.

7. The method of approximately calculating the thickness of a bundle of electric wires according to claim 1, further comprising the step of finding average value data representative of the average value of the the thickness of the electric wires by type.

8. The method of approximately calculating the thickness of a bundle of electric wires according to claim 1, wherein the thickness represented by the thickness data is multiplied by a predetermined alignment correction factor.

9. An apparatus for approximately calculating the thickness of a bundle of electric wires to be constructed by bundling plural types of electric wires which differ in diameter, said apparatus comprising:

means for inputting input data representing a diameter of each of the electric wires and the number of electric wires to be bundled;

means for storing input data input by said inputting means;

electric wire number calculating means, said electric wire number calculating means finding a sum of the cross-sectional areas of the electric wires constituting the bundle of plural types of electric wires from input data stored in said storing means, and providing sum data indicative thereof in response to termination of inputting of input data by said inputting means, said calculating means further calculating a number of electric wires required to obtain the sum represented by the sum data when the bundle of plural types of electric wires is assumed to be a bundle of electric wires of a single type which is constituted by only electric wires of a predetermined type out of the plural types of electric wires and providing number of wire data representative thereof; and thickness calculating means for calculating the thickness of the bundle of plural types of electric wires based upon number of wire data provided by said electric wire number calculating means and providing thickness data representative thereof.

10. The calculating apparatus according to claim 9, wherein said electric wire number calculating means comprises means for converting the bundle of plural types of electric wires to a bundle assumed to be of electric wires of a single type with respect to all types of electric wires constituting the bundle of plural types of electric wires, calculating the number of electric wires by type, and providing number of wire data representative thereof.

11. The calculating apparatus according to claim 9, wherein said thickness calculating means includes means for calculating a calculated perimeter ratio k=D/d when D is taken as the diameter of the bundle assumed to be of electric wires of a single type and d is taken as the diameter of one of the electric wires constituting the bundle of plural types of electric wires, and means for calculating the thickness using said calculated perimeter ratio K.

12. The calculating apparatus according to claim 9, wherein said thickness calculating means includes means for calculating a calculated perimeter ratio k=D/d when D is taken as the diameter of the bundle assumed to be of electric wires of a single type and d is taken as the diameter of one of the electric wires constituting the bundle of plural types of electric wires, and means for calculating the thickness using said calculated perimeter ratio k.

13. The calculating apparatus according to claim 9, further comprising means for multiplying the thickness of the bundle of plural types of electric wires represented by the thickness data by a predetermined alignment correction factor.

* * * * *